United States Patent
Smith et al.

(10) Patent No.: US 10,842,066 B2
(45) Date of Patent: *Nov. 24, 2020

(54) GROUND TREATMENT DEVICE

(71) Applicant: Innovative Concepts, LLC, College Grove, TN (US)

(72) Inventors: Eden T. Smith, College Grove, TN (US); Todd M. Smith, Pleasant View, TN (US)

(73) Assignee: Innovative Concepts, LLC, College Grove, TN (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/888,465

(22) Filed: Feb. 5, 2018

(65) Prior Publication Data

US 2018/0153085 A1 Jun. 7, 2018

Related U.S. Application Data

(63) Continuation-in-part of application No. 14/738,045, filed on Jun. 12, 2015, now Pat. No. 9,883,629.

(Continued)

(51) Int. Cl.
*A01B 45/00* (2006.01)
*A01D 34/00* (2006.01)
(Continued)

(52) U.S. Cl.
CPC ............ *A01B 45/026* (2013.01); *A01B 45/00* (2013.01); *A01B 45/02* (2013.01); *A01B 51/026* (2013.01); *A01D 34/001* (2013.01); *A01B 49/04* (2013.01)

(58) Field of Classification Search
CPC ....... A01B 45/00; A01B 45/02; A01B 45/026; A01B 49/04; A01B 49/027; A01B 51/023; A01B 51/026; A01D 43/12; A01D 42/00; A01D 42/02; A01D 42/04; A01D 42/06; A01D 34/001; B62D 63/06; B62D 63/065; B62D 51/02
See application file for complete search history.

(56) References Cited

U.S. PATENT DOCUMENTS 3,336,042 A * 8/1967 Southall ................. A01D 34/62
280/47.371
5,398,768 A * 3/1995 Staples .................. A01B 45/02
172/122

(Continued)

OTHER PUBLICATIONS

Behrens, A., U.S. Appl. No. 14/738,045, Office Action1, dated Sep. 13, 2016, 35 pages.

(Continued)

*Primary Examiner* — Robert E Pezzuto
*Assistant Examiner* — Adam J Behrens
(74) *Attorney, Agent, or Firm* — LaBatt, LLC

(57) ABSTRACT

An apparatus for performing a ground treatment, such as aeration or dethatching, is provided. The apparatus includes a base frame component to which a pair of angled side frame components are pivotally mounted. Each angled side frame can include first and second ends that are oriented to form a central angle. A first end of an angled side frame can be pivotally attached to a wheel and/or the base frame component, while the second end can include a mechanism for mounting a ground treatment component.

20 Claims, 12 Drawing Sheets

Related U.S. Application Data

(60) Provisional application No. 62/565,473, filed on Sep. 29, 2017, provisional application No. 62/011,756, filed on Jun. 13, 2014.

(51) Int. Cl.
  *A01B 45/02* (2006.01)
  *A01B 51/02* (2006.01)
  *A01B 49/04* (2006.01)

(56) References Cited

U.S. PATENT DOCUMENTS

| | | | | |
|---|---|---|---|---|
| 5,398,769 A * | 3/1995 | Staples | A01B 45/02 | 172/21 |
| 5,579,847 A * | 12/1996 | Postema | A01B 45/02 | 172/21 |
| 5,586,604 A * | 12/1996 | Postema | A01B 45/02 | 172/21 |
| 5,623,996 A * | 4/1997 | Postema | A01B 45/02 | 172/118 |
| 6,145,855 A * | 11/2000 | Bellis, Jr. | B62D 49/065 | 280/32.7 |
| 6,179,061 B1 * | 1/2001 | Fiore | A01B 63/26 | 172/21 |
| 6,241,025 B1 * | 6/2001 | Myers | A01B 35/28 | 172/21 |
| 6,457,903 B1 * | 10/2002 | Dufty | A01B 29/06 | 172/118 |
| 6,460,624 B1 * | 10/2002 | Dufty | A01B 45/02 | 172/21 |
| 6,497,422 B1 * | 12/2002 | Bellis, Jr. | B62D 49/065 | 280/32.7 |
| 6,637,760 B1 * | 10/2003 | Carman | A01D 34/001 | 280/32.7 |
| 6,659,190 B2 * | 12/2003 | Jessen | A01B 45/02 | 172/21 |
| 6,832,657 B1 * | 12/2004 | LaFlair | A01B 59/064 | 172/21 |
| 7,070,005 B2 * | 7/2006 | Maas | A01B 45/026 | 172/22 |
| 7,300,061 B1 * | 11/2007 | Omstead | A01D 67/00 | 280/32.7 |
| 7,527,285 B2 * | 5/2009 | Vachal | B62D 51/008 | 280/32.7 |
| 7,743,840 B2 * | 6/2010 | Hoffman | A01B 45/02 | 172/21 |
| 8,033,552 B1 * | 10/2011 | Jacobs | B60D 1/145 | 180/15 |
| 8,459,371 B2 * | 6/2013 | Hoffman | A01B 45/02 | 172/21 |
| 2003/0201106 A1 * | 10/2003 | Jessen | A01B 45/02 | 172/21 |
| 2008/0196373 A1 * | 8/2008 | Wilson | A01B 45/026 | 56/10.1 |
| 2009/0096178 A1 * | 4/2009 | Beal | A01D 34/001 | 280/32.7 |
| 2009/0236106 A1 * | 9/2009 | Hoffman | A01B 45/02 | 172/21 |
| 2012/0211954 A1 * | 8/2012 | Havener | A01D 34/001 | 280/32.7 |
| 2015/0359159 A1 | 12/2015 | Smith et al. | | |

OTHER PUBLICATIONS

Behrens, A., U.S. Appl. No. 14/738,045, Final Office Action1, dated Mar. 1, 2017, 27 pages.

Behrens, A., U.S. Appl. No. 14/738,045, Notice of Allowance, dated Oct. 26, 2017, 5 pages.

* cited by examiner

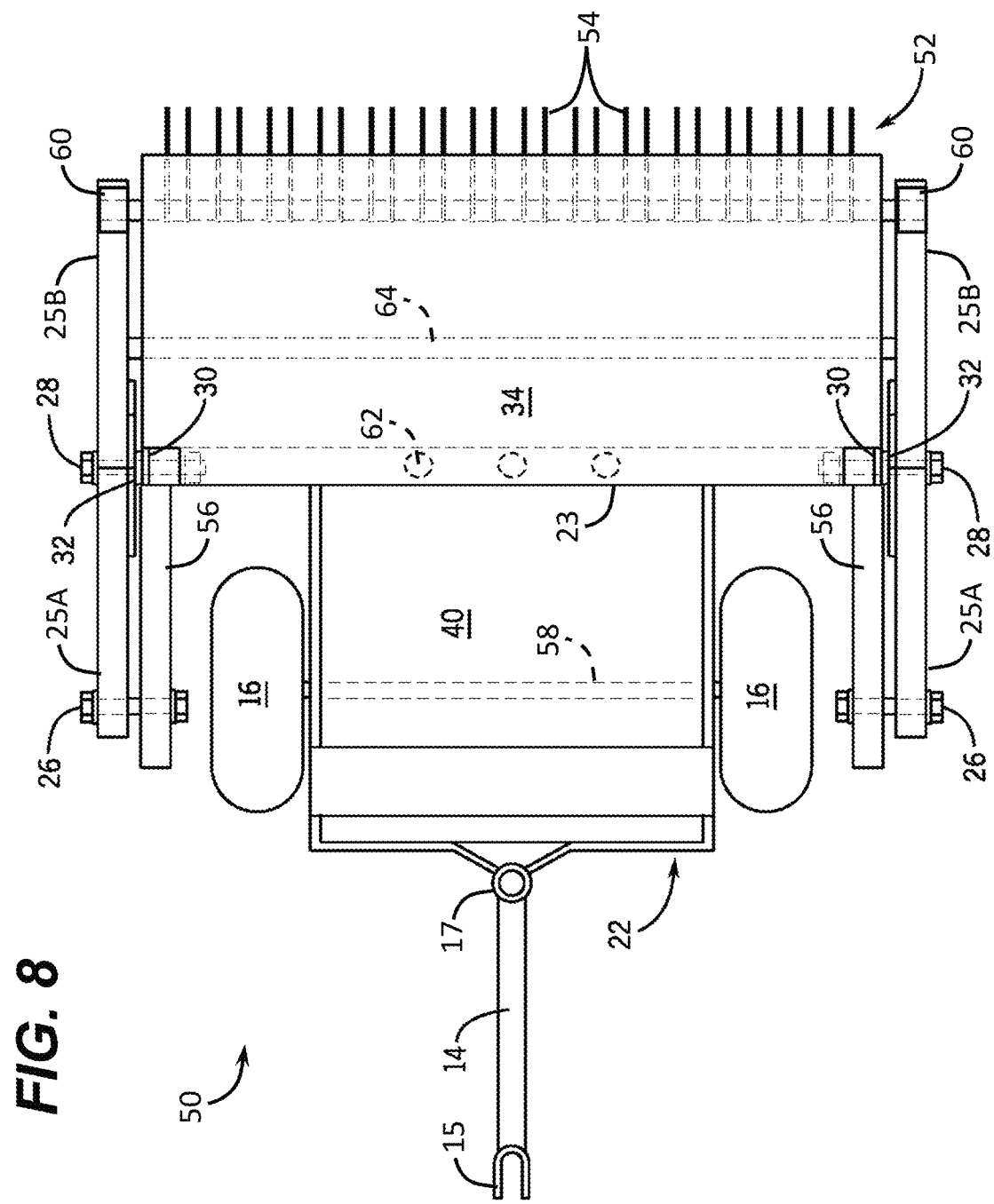

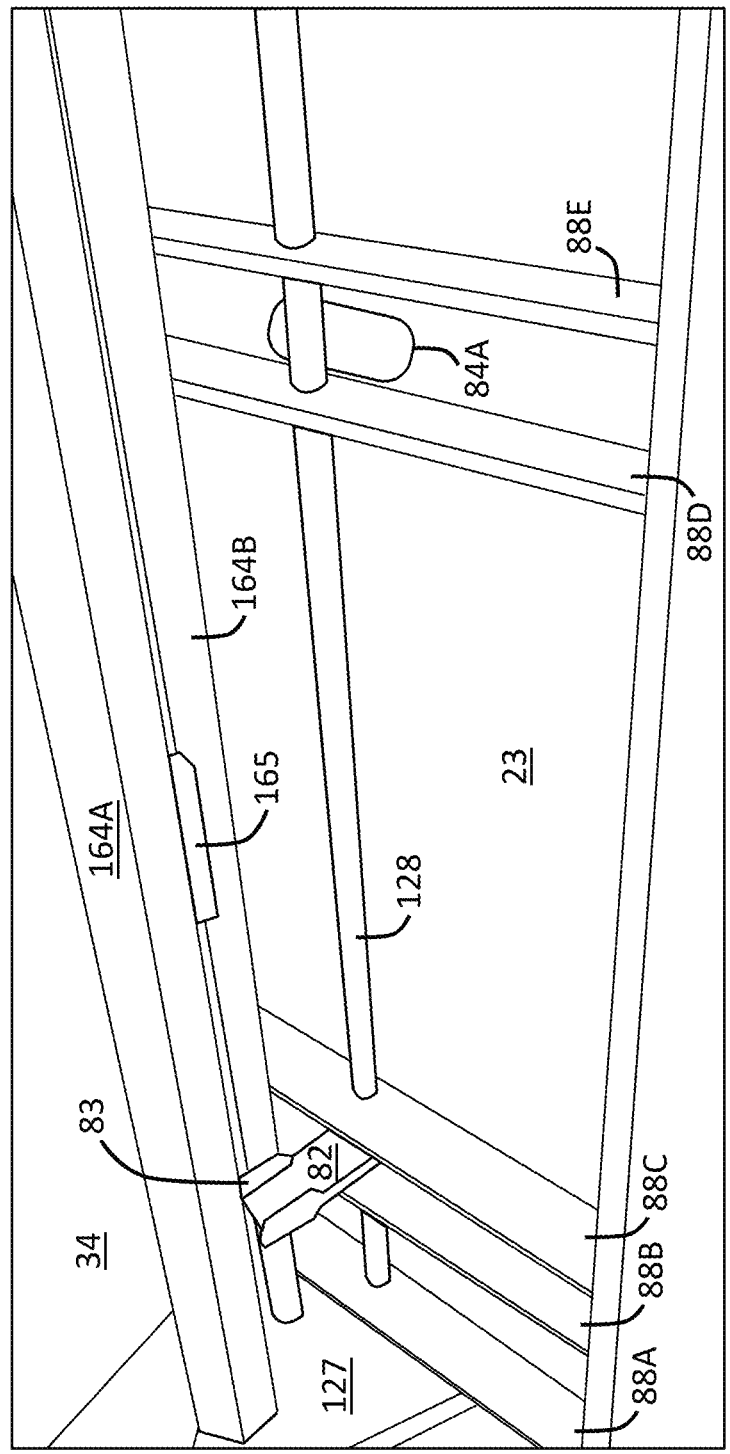

GROUND TREATMENT DEVICE

REFERENCE TO RELATED APPLICATIONS

The current application claims the benefit of U.S. Provisional Application No. 62/565,473, filed on 29 Sep. 2017, and is a continuation-in-part of U.S. Nonprovisional Utility application Ser. No. 14/738,045, filed on 12 Jun. 2015, which claims the benefit of U.S. Provisional Application No. 62/011,756, filed on 13 Jun. 2014, each of which is hereby incorporated by reference.

TECHNICAL FIELD

The disclosure relates generally to ground treatment, and more particularly, to a device for performing a ground treatment operation, such as aeration.

BACKGROUND ART

In lawn care, a sulky is an attachment that allows an operator of a lawnmower to ride behind the lawnmower. In general, the sulky is attached to a walk-behind lawnmower and the operator stands or sits on the sulky while operating the lawnmower. Sulkies are commonly used by landscapers, as they enable the landscaper to operate the lawnmower at full speed without tiring from walking/jogging.

Lawn aeration is a common landscaping operation. Some previous approaches have sought to combine an aerator with a sulky. One approach proposes that the operator stand on a first platform when aerating is not desired, and stand on a second platform when aerating. The weight of the operator on the sulky forces the tines into the soil. In another approach, the operator stands on a platform located behind a tine assembly.

SUMMARY OF THE INVENTION

Aspects of the invention provide a ground treatment device having one or more features described herein. In an illustrative embodiment, the ground treatment device comprises an aeration device, which is configured to be attached to a self-propelled machine, such as a walk-behind lawnmower. For example, aspects of the invention provide an apparatus for performing a ground treatment, such as aeration or dethatching. The apparatus includes a base frame component to which a pair of angled side frame components are pivotally mounted. Each angled side frame can include first and second ends that are oriented to form a central angle. A first end of an angled side frame can be pivotally attached to a wheel and/or the base frame component, while the second end can include a mechanism for mounting a ground treatment component.

A first aspect of the invention provides an apparatus comprising: a base frame component; a pair of wheels; and a pair of angled side frame components pivotally mounted to the base frame component, each angled side frame component including: a first end on which a wheel of the pair of wheels is pivotally connected; a central angle; and a second end, the second including means for removably mounting a ground treatment component.

A second aspect of the invention provides an apparatus comprising: a base frame component; a pair of wheels; a pair of angled side frame components, each angled side frame component including: a front arm and a back arm, wherein the front arm and the back arm are oriented to form an inverted angle; and a plate permanently attached to the front arm and the back arm forming the inverted angle, wherein the plate is pivotally mounted to the base frame component, wherein the back arm includes means for removably mounting a ground treatment component; and means for pivotally attaching the pair of wheels to at least one of: the base frame component or the pair of angled side frame components.

A third aspect of the invention provides an apparatus comprising: a base frame component including: a vertically oriented back plate; and a horizontally oriented platform extending from a bottom, central portion of the vertically oriented back plate; a pair of wheels; a pair of angled side frame components, each angled side frame component including: a front arm to which a wheel of the pair of wheels is pivotally connected; a back arm including means for removably mounting a ground treatment component, wherein the front arm and the back arm are oriented to form an inverted angle; and a plate permanently attached to the front arm and the back arm forming the inverted angle, wherein the plate is pivotally mounted to the vertically oriented back plate; and the ground treatment component mounted to the back arm of each angled side frame component of the pair of angled side frame components.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 8 shows a top plan view of an illustrative dethatching device according to an embodiment.

FIG. 11 shows details of an illustrative vertically oriented back plate and lift mechanism of a ground treatment device according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a ground treatment device having one or more features described herein. In an illustrative embodiment shown herein to illustrate unique aspects of the invention, the ground treatment device comprises an aeration device, which is configured to be attached to a self-propelled machine, such as a walk-behind lawnmower. For example, aspects of the invention provide an apparatus for performing a ground treatment, such as aeration or dethatching. The apparatus includes a base frame component to which a pair of angled side frame components are pivotally mounted. Each angled side frame can include first and second ends that are oriented to form a central angle. A first end of an angled side frame can be pivotally attached to a wheel and/or the base frame component, while the second end can include a mechanism for mounting a ground treatment component.

As used herein, unless otherwise noted, the term "set" means one or more (i.e., at least one) and the phrase "any solution" means any now known or later developed solution. As also used herein, unless otherwise noted, the term "approximately" is inclusive of a range of values including values +/−20% of the stated value.

Figure 1:
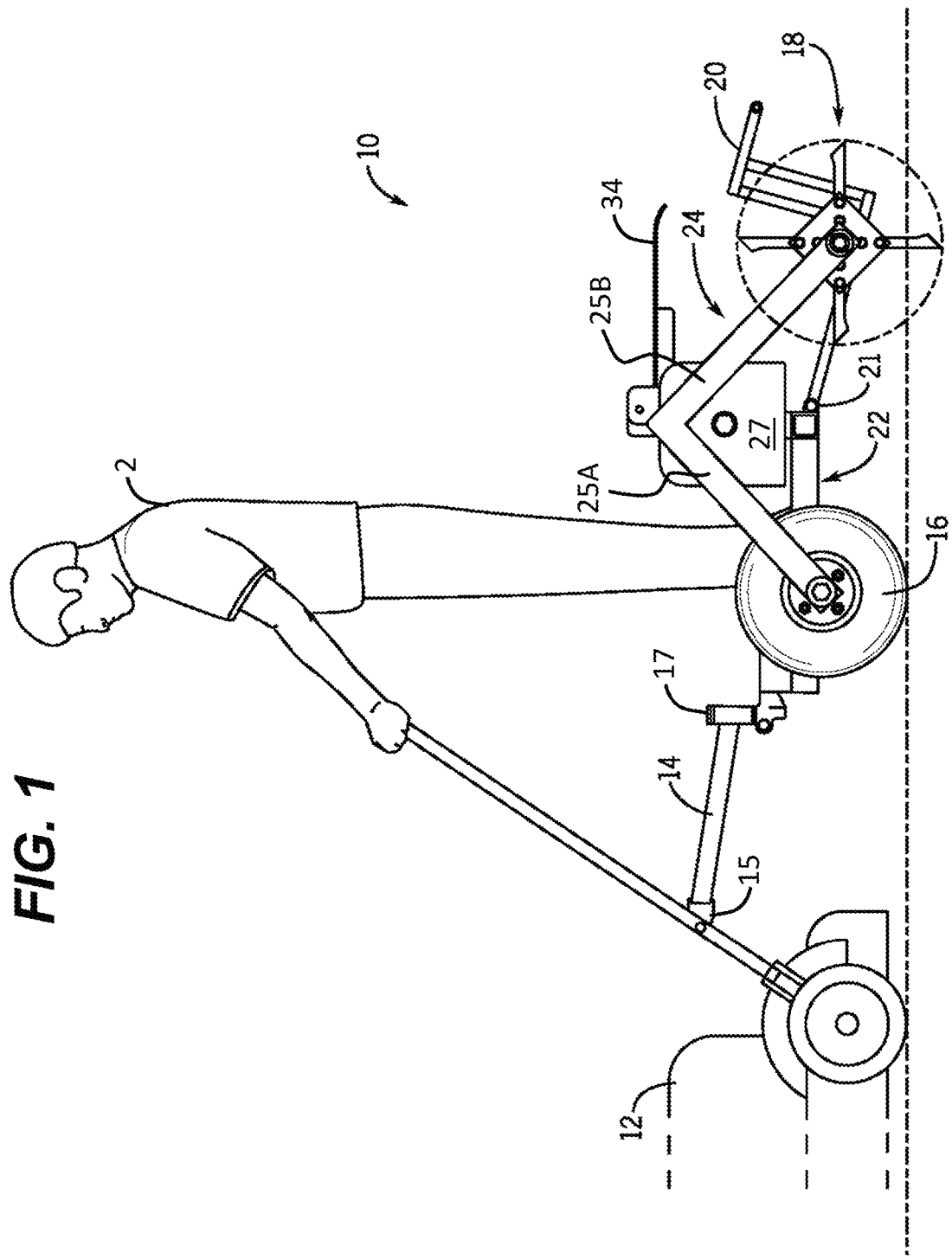
FIG. 1 shows a side elevation view of an illustrative aeration device in use in an aeration mode according to an embodiment.

Turning to the drawings, FIG. 1 shows a side elevation view of an aeration device 10 in use in an aeration mode according to an embodiment. As illustrated, the aeration device 10 can be attached to a self-propelled machine 12, which can be operated by a user 2 from a location at the rear of the machine 12. The machine 12 can comprise any type of self-propelled machine including an engine, wheels, and operating controls accessible to a user 2 located behind the machine. In an illustrative embodiment, the machine 12 comprises a walk-behind lawnmower, such as a commercial walk-behind lawnmower. However, it is understood that the machine 12 can comprise any type of machine having sufficient power to pull the aeration device 10 (or other ground treatment device) and operator 2 as described herein.

Figure 2:
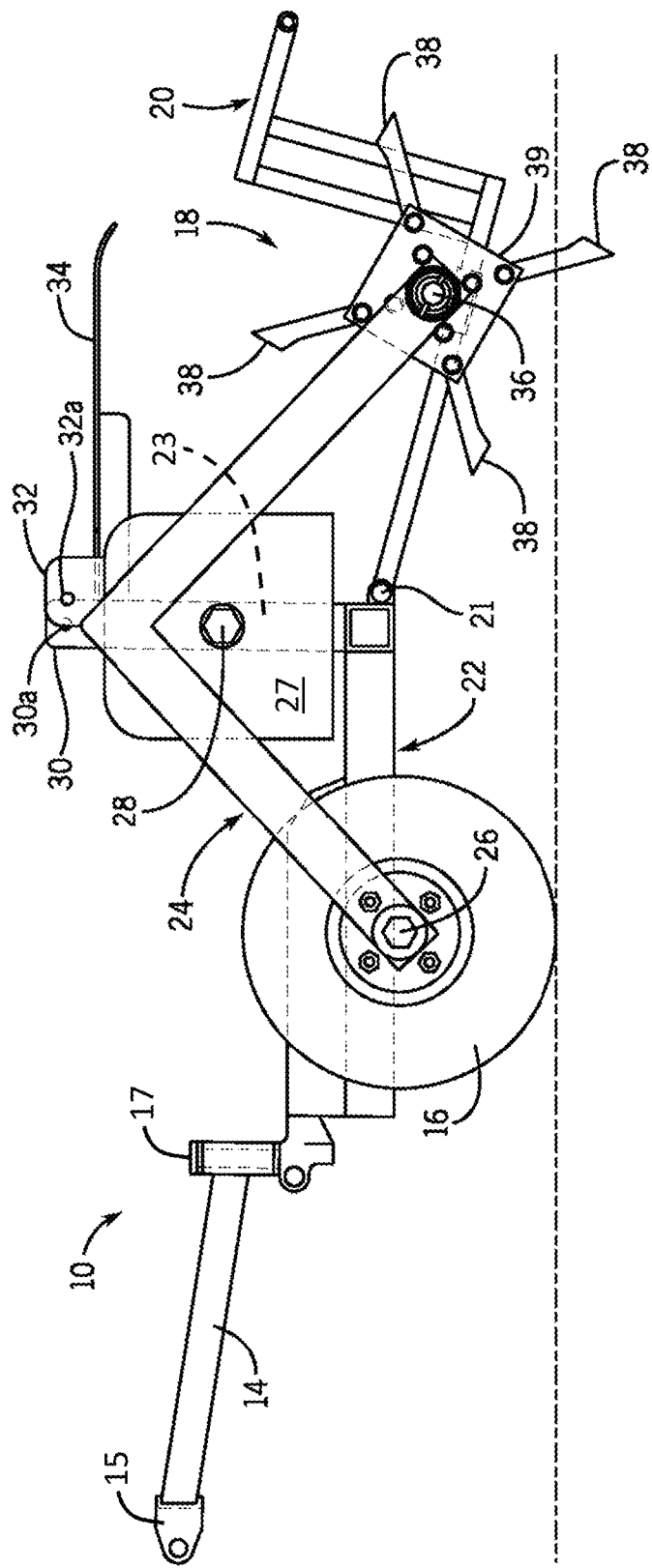
FIG. 2 shows another side elevation view of an illustrative aeration device according to an embodiment.
Figure 3:
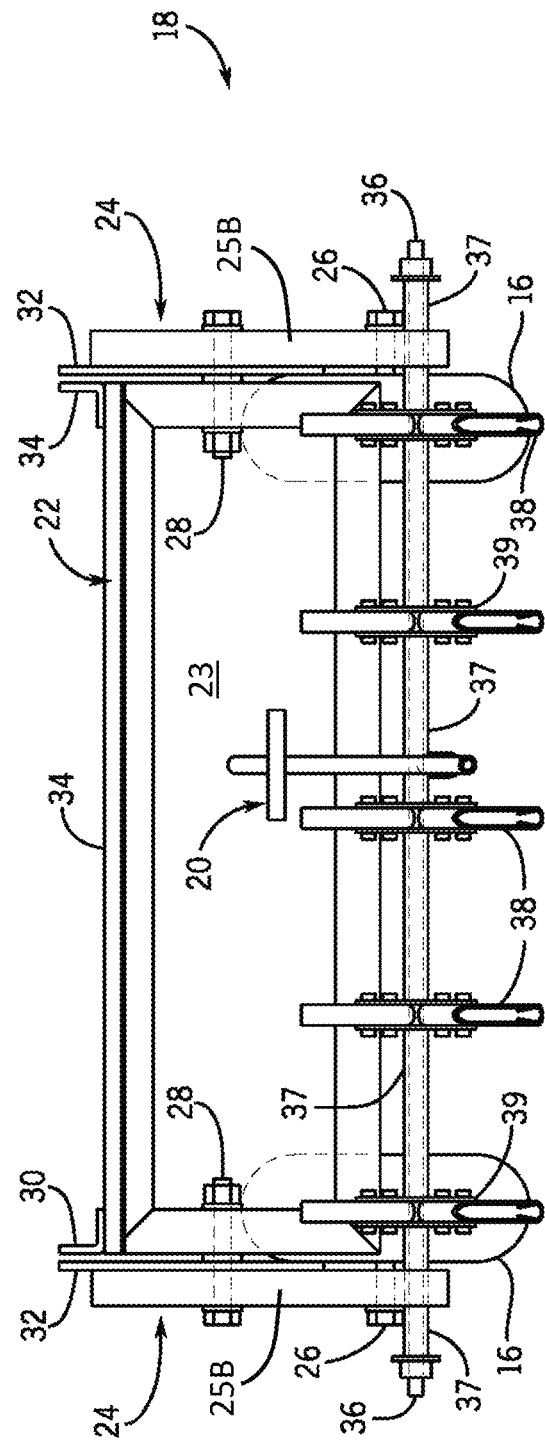
FIG. 3 shows a rear elevation view of an illustrative aeration device according to an embodiment.
Figure 4:
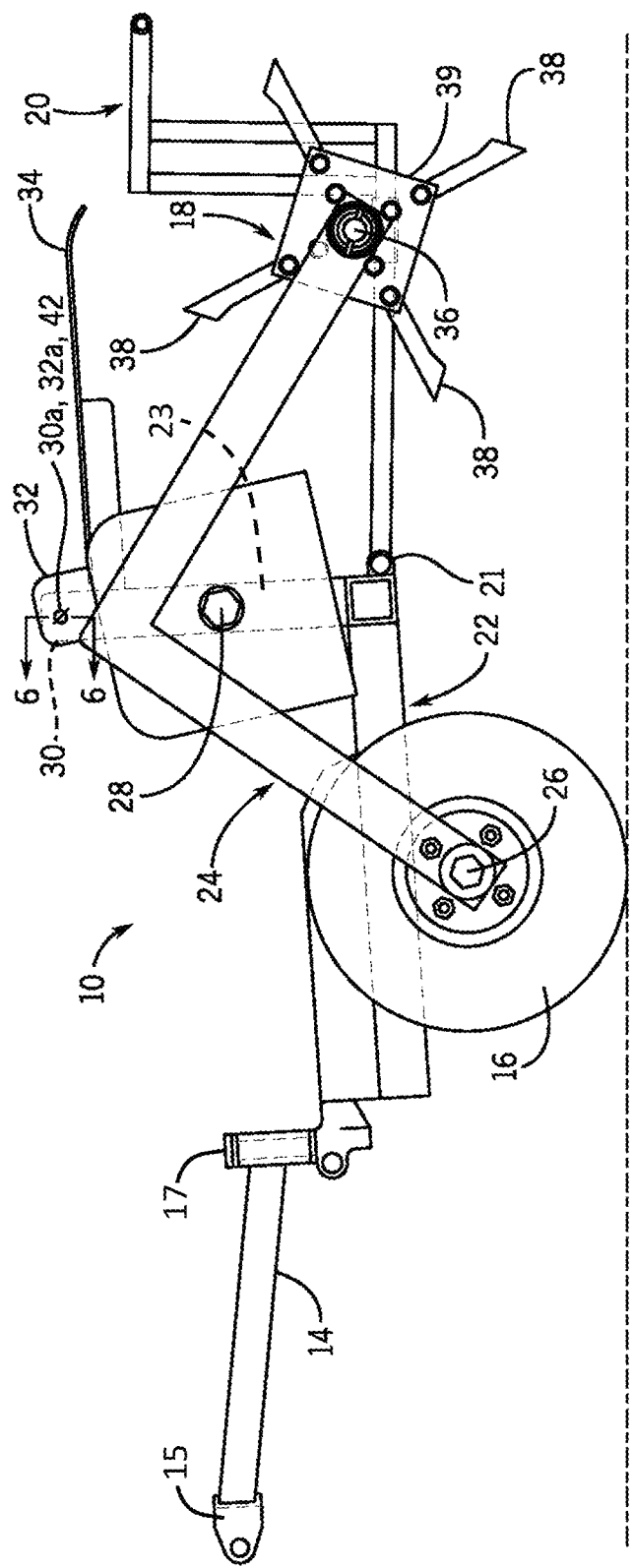
FIG. 4 shows a side elevation view of an illustrative aeration device in transportation mode according to an embodiment.
Figure 5:
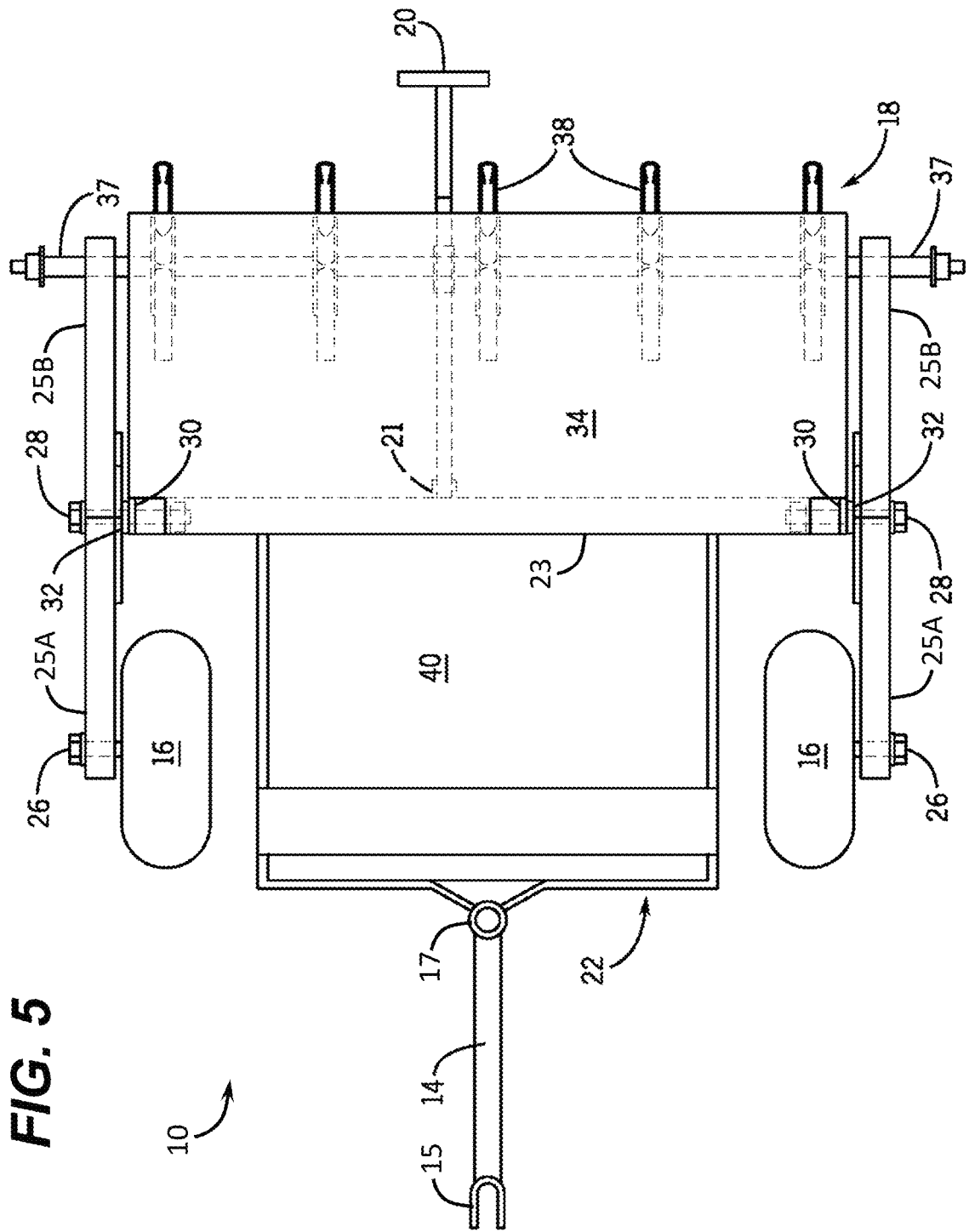
FIG. 5 shows a top plan view of an illustrative aeration device according to an embodiment.

Further illustrative aspects of a first embodiment of the invention are shown and described in conjunction with FIGS. 1-5. FIG. 2 shows another side elevation view of an aeration device 10 according to an embodiment; FIG. 3 shows a rear elevation view of an aeration device 10 according to an embodiment; FIG. 4 shows a side elevation view of an aeration device 10 in transportation mode according to an embodiment; and FIG. 5 shows a top plan view of an aeration device 10 according to an embodiment.

Referring generally to FIGS. 1-5, the aeration device 10 can be temporarily pivotally connected to the machine 12 via a pull bar 14. In an embodiment, a first end of the pull bar 14 is attached to the machine 12 using an attachment mechanism 15 that provides a fixed extension from the machine 12 (e.g., approximately 15-17 inches), and a second end of the pull bar 14 is attached to a base frame component 22 of the aeration device 10 using a pivotal attachment mechanism 17 (e.g., a clevis pin, or the like). The pivotal attachment mechanism 17 can be configured to provide any desired turn radius for the aeration device 10. In an embodiment, the turn radius is similar to that provided by standard sulkies configured for use behind commercial walk-behind lawnmowers. Furthermore, the pivotal attachment mechanism 17 can enable the aeration device 10 to maintain direction when the machine 12 is operated in both a forward and reverse direction.

The base frame component 22 includes a horizontally oriented platform 40 (e.g., having dimensions of approximately 16 inches by 24 inches) on which the user can stand while operating the machine 12 (and using the aeration device 10). Additionally, the base frame component 22 includes a vertically oriented back plate 23, which extends upward from the rear of the platform 40 (e.g., by approximately 7 inches). The vertically oriented back plate 23 can have a width (e.g., approximately 37 inches), with the platform 40 centrally located, to provide space on each side of the platform 40 to accommodate the wheels 16 as described herein. The base frame component 22 also can include a horizontally oriented safety cover 34, which can extend beyond a top of the vertically oriented back plate 23 over at least a portion of the aeration component 18 of the aeration device 10.

The aeration device 10 can travel along a pair of wheels 16. The wheels 16 can comprise any type of wheels 16 having any desired size. In an embodiment, the wheels 16 have a ten inch diameter. Each wheel 16 can be pivotally connected to a first end of a corresponding side frame component 24 using a pivotal connecting mechanism 26 (e.g., a 4" bolt and locknut). An aeration component 18 can be attached between the opposing ends of each of the side frame components 24 towards the rear of the aeration device 10. In this configuration, the wheels 16 and aeration component 18 are held in a free floating position, which can facilitate negotiation of the aeration device 10 over uneven terrain. Each side of the side frame component 24 can be pivotally attached to a corresponding side of the vertically oriented back plate of the base frame component 22 using a pivotal attachment mechanism 28 (e.g., a 4" bolt and locknut). In an embodiment, each side frame component 24 includes two arms 25A, 25B which are oriented with respect to one another to form a central angle, which can be in the shape of an inverted V, and includes a plate 27 permanently fixed (e.g., welded) to the two arms 25A, 25B at a location near the vertex of the central angle. In this case, the pivotal attachment mechanism 28 can extend through the plate 27 and into the base frame component 22 in a location substantially aligned with the vertex of the central angle formed by the two arms 25A, 25B. While the two arms 25A, 25B are shown connected, it is understood that the two arms 25A, 25B could remain apart and/or be connected by another piece with a different alignment than that of two arms 25A, 25B (e.g., a substantially horizontal arm).

The aeration component 18 can comprise a shaft 36, which extends through an opening in each of the side frame components 24 (e.g. the arm 25B of each side frame component 24) on one side of the central angle adjacent to one end of the side frame components 24. Furthermore, the aeration component 18 can include a set of plates 39, each of which includes a set of tines 38 (e.g., corers, spikes, and/or the like). In an embodiment, each tine 38 is attached to a plate 39 in a manner that allows the tine 38 to be removed and replaced with a different tine 39. Each plate 39 can be attached to the shaft 36 in a manner that causes the plate 39 and/or shaft 36 to rotate due to the motion of the aeration device 10 and forces resulting from the tines 38 entering and exiting the ground. For example, a plate 39 can comprise a free wheeling double sided aerator wheel including four tines 39. The plates 39 can be fabricated of steel and the shaft 36 can comprise a heavy duty steel axle to provide sufficient strength to endure side to side motion expected during commercial use, which may include: use in conjunction with a high speed machine 12, such as a commercial lawn mower; working on several properties; many hours of use; and/or the like. Furthermore, the aeration component 18 can include a set of spacers 37, which are configured to maintain any desired spacing between adjacent plates 39, a plate 39 and the side frame component 24, and/or the like. Regardless, the various tines 38 can be configured to rotate independently from one another, which can improve performance of the aeration component 18, e.g., when turning.

The aeration device 10 can include a mechanism to enable the aeration component 18 to be secured in an elevated position to facilitate, for example, transport of the aeration device 10. To this extent, the aeration device 10 is shown including an adjustment handle 20, which can be pivotally attached to a location on the base frame component 22 using any type of pivotal attachment mechanism 21 (e.g., opposing tabs and an adjustment handle 20 end inserted there between including holes which can be aligned with a bolt inserted there through, a pivot sleeve in or over which the handle can be inserted, and/or the like). The adjustment handle 20 can include a first portion that extends under the shaft 36 of the aeration component 18, and a second portion that extends upward to allow for easier operation by an individual. In an embodiment, the pivotal attachment mechanism 21 is configured to limit downward motion of the adjustment handle 20 such that the adjustment handle 20 remains suspended and does not drag along the ground during use of the aeration device 10. Furthermore, the adjustment handle 20 can be configured to be removed during use of the aeration device 10. In this case, the aeration device 10 can include a mechanism for securely storing the adjustment handle 20, e.g., on or below the safety cover 34 during use of the aeration device 10.

Figure 6:
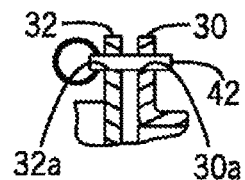
FIG. 6 shows a cross-sectional view taken on line 6-6 of FIG. 4 according to an embodiment.
Figure 7A:
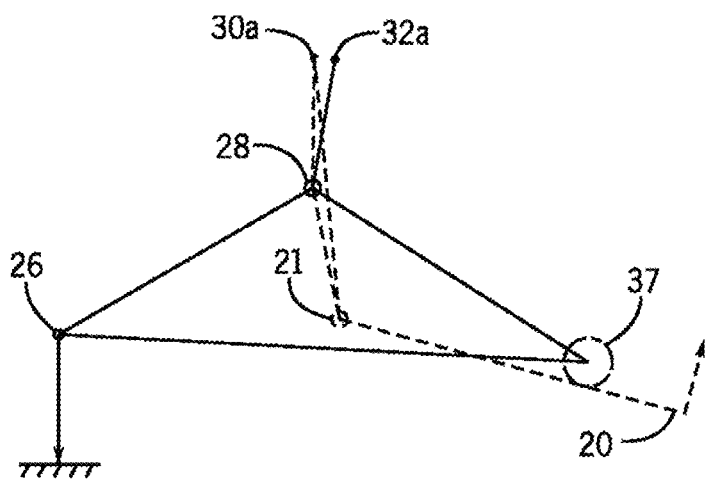
FIGS. 7A and 7B show schematic views of an aeration device in aeration and transportation modes, respectively, according to embodiments.
Figure 7B:
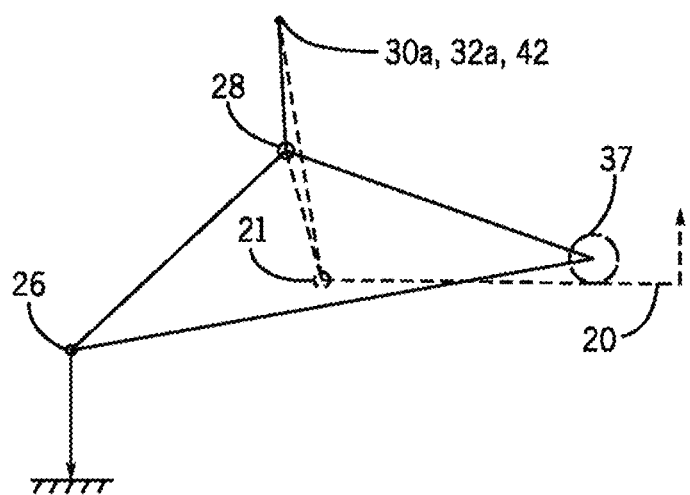

Regardless, to lift the aeration component 18, an individual can lift up on the adjustment handle 20, which will exert an upward force on the shaft 36 of the aeration component 18. The aeration component 18 can be secured in an elevated position using any solution. For example, as shown in FIGS. 4 and 6, the base frame component 22 can include a tab 30 with a hole 30a there through and the side frame component 24 can include a similarly configured tab 32 with a hole 32a there through. FIGS. 7A and 7B show schematic views of the aeration device 10 in aeration and transportation modes, respectively, according to embodiments. The tabs 30, 32 and corresponding holes 30a, 32a can be located such that the upward force on the shaft 36 causes the holes 30a, 32a located on the tabs 30, 32 of the base frame component 22 and side frame component 24, respectively, to align. The individual can insert a pin 42 through the aligned holes to keep the aeration component 18 elevated. A user can continue to stand on the platform 40 and operate the machine 12 while the aeration component 18 is in transport mode.

To configure the aeration device 10 for use, the individual can lift up on the adjustment handle 20 to relieve pressure on the pin(s) 42, remove the pin(s) 42, and lower the adjustment handle 20, thereby allowing the aeration component 18 to lower. In an embodiment, each side of the base frame component 22 and side frame component 24 includes tabs 30, 32 with holes 30a, 32a. Alternatively, only a single side can include the tabs 30, 32. Furthermore, the tabs 30, 32 can be located in a different location. For example, the safety cover 34 and handle 20 can include the tabs 30, 32 or a similar mechanism. Regardless, it is understood that the use of tabs 30, 32 and pin(s) 42 to secure the aeration component 18 in an elevated position is only illustrative of various mechanisms, which can be utilized.

In an embodiment, during operation of the aeration device 10 in an aeration mode, each side frame component 24 can act as an equalizer bar, which brings the weight of the operator 2 down to the wheels 16 in the front and the aeration component 18 in the back in such a way as to cause the tines 38 to remain in contact with the ground. The downward force of the weight of the operator 2 is counteracted by an equal upward force exerted by the wheels 16 in the front. This upward force also creates an additional downward force on the aeration component 18, further causing the tines 38 to remain in contact with the ground. Additionally, a combination of the base frame component 22 and side frame components 24 provide a rigid platform in which the operator 2 will be able to travel over uneven ground while safely maintaining control of the machine 12.

The various components described herein can be constructed of any type of material capable of providing sufficient strength and durability for a number of repeated uses of the aeration device 10. For example, the base frame component 22 can comprise a steel reinforced platform having a thickness of approximately ⅛", and the side frame components 24 can be constructed of square steel tubing having a diameter of approximately 1.5 inches, or a thinner steel having a comparable strength. The pull bar 14 can be formed of 1½" square steel tubing.

It is understood that the various dimensions described herein are only illustrative and any combination of the dimensions can be changed to provide a desired feature. For example, in an embodiment, an overall width of the aeration device 10 can be approximately thirty-six inches or less. In this case, the widths of the horizontal platform 40, the vertically oriented back plate 23, the safety cover 34, and the shaft 36 of the aeration component 18 can be made shorter (e.g., by approximately three inches) than that of the embodiment described above. Similarly, a number of and/or spacing between the tines 39 can be adjusted to accommodate a smaller or larger width. However, it is understood that these widths are only illustrative, and a ground treatment device 10 described herein can have any width.

While shown and described herein as an aeration device 10, it is understood that aspects of the invention further provide various alternative embodiments. For example, in one embodiment, the invention provides a device configured to perform one or more alternative ground treatment operations. Such a device can include an alternative ground treatment component and/or be re-configured by removing and inserting any one of a plurality of different ground treatment components. For example, instead of an aerating component 18, an embodiment of the device can include a grass cutting component, a seed planting component, a fertilizing component, a harvesting component, a mulching component, a bagging component, a dethatching component, and/or the like. In each case, the corresponding component can be designed using any solution. Furthermore, one or more aspects of the aerating component 18 (e.g., dimensions) shown and described herein can be modified to accommodate the alternative component using any solution.

To this extent, FIG. 8 shows a top plan view of an illustrative dethatching device 50 according to an embodiment. In FIG. 8, similar numbering is used to refer to components of the dethatching device 50 which are similarly configured as the corresponding components shown and described in conjunction with the aeration device 10 (FIGS. 1-6). However, in this case, the dethatching device 50 includes a dethatching component 52 attached to the side frame components 24 via attachment mechanisms 60. The dethatching component 52 can include a plurality of tines 54, which are configured to scrape a top surface of the ground when in use to remove thatch built up thereon and/or scarify the soil.

In this embodiment, the base frame component 22 includes a pair of side extensions 56, which extend from the vertically oriented back plate 23. The side frame components 24 are pivotally attached to an end of each of the side extensions 56 using a pivotal connecting mechanism 26. Each side extension 56 can comprise, for example, square steel tubing having a diameter of approximately 1.5 inches, or a thinner steel having a comparable strength, which is permanently attached (e.g., welded) to the vertically oriented back plate 23. Additionally, the wheels 16 are shown secured to the horizontally oriented platform 40 of the base frame component 22 using any solution, e.g., via an axle 58, a pair of pivotal connecting mechanisms, and/or the like. In this case, the platform 40 and wheels 16 can be detached from the remainder of the dethatching device 50 and used apart from a ground treatment component, such as the dethatching component 52, as a standalone sulky. For example, the platform 40 can be connected to the vertically oriented back plate using a series of connector bolts 62 or the like. Furthermore, the dethatching component 52 can be removed for repair, swapped out for attachment of another ground treatment component (such as the aerating component 18) to the base frame component 22, and/or the like.

A ground treatment device described herein can include various other features and/or alternative configurations. For example, the dethatching component 50 is shown including a stabilizer 64, which can be attached to each side frame component 24, e.g., the arm 25B of each side frame component 24 to stiffen the dethatching device 50 for side to side forces. The stabilizer 64 can comprise, for example, a one inch square steel tubing, or a thinner steel having a comparable strength, which can be temporarily (e.g., using one or more bolts and locknuts) or permanently (e.g., welded) attached to the interior sides of the arms 25B of each side frame component 24. The stabilizer 64 can be placed so as not to interfere with the operation of any ground treatment component, which can be attached to the side frame components 24 as discussed herein. Inclusion of the stabilizer 64 can enable a user to more readily lift the side frame components 24, e.g., to secure the dethatching component 52 in an elevated position as described herein (e.g., without the need for an adjustment handle 20). To this extent, each side frame component 24 can further include a mechanism for indicating or otherwise facilitating the user's ability to grip the arm(s) 25B to lift the dethatching component 52. For example, a handle can be removably attached to an arm 25B and/or the stabilizer 64.

Figure 9:
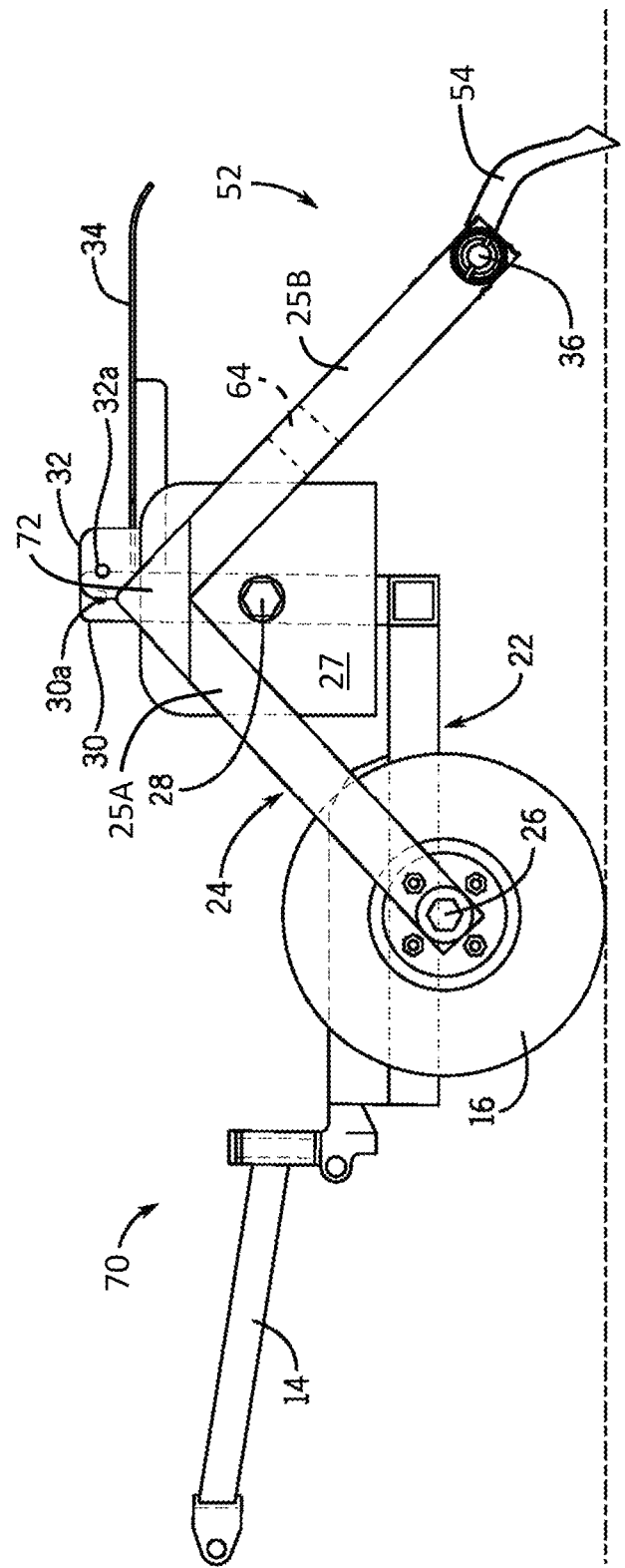
FIG. 9 shows a side elevation view of an illustrative dethatching device according to an embodiment.

FIG. 9 shows a side elevation view of an illustrative dethatching device 70 according to another embodiment. In FIG. 9, similar numbering is used to refer to components of the dethatching device 70 which are similarly configured as the corresponding components shown and described in conjunction with the aeration device 10 (FIGS. 1-6) and/or the dethatching device 50 (FIG. 8). The dethatching device 70 is shown including a triangular metal bracket 72 (e.g., a gusset), which can be permanently attached to the plate 27 (e.g., welded) at a location where the arms 25A, 25B intersect, e.g., to provide increased support at the intersection. Additionally, in an embodiment, the plate 27 itself can be a triangular metal bracket, which is sized to allow for attachment of the plate 27 to the base frame component 22 using the pivotal attachment mechanism 28. It is understood that the embodiments shown and described herein are only illustrative and numerous variations are possible. To this extent, an embodiment can include any combination of the features shown and described in conjunction with only one of the embodiments.

In an illustrative embodiment, the wheels 16 can be configured to be selectively attached to the side frame components 24 as shown and described in FIGS. 1-5, to the platform 40 as shown and described in conjunction with FIG. 8 (e.g., when the side frame components 24 have been removed), and/or to the side extensions 56, e.g., in a similar manner as the wheels 16 are mounted to the side frame components 24. Furthermore, an embodiment can include wheels pivotally attached to or adjacent to the ends of the side frame components 24 to which a ground treatment component can be attached. For example, such wheels can be pivotally attached to the shaft 36 of the ground treatment component, to the arm 25B using a pivotal connecting mechanism (e.g., a 4" bolt and locknut), and/or the like. Such wheels may be desirable for various types of ground treatment components and/or be included as part of a ground treatment component and can be any suitable type and size, such as the same size or smaller than the wheels 16, or bigger than the wheels 16.

Figure 10A:
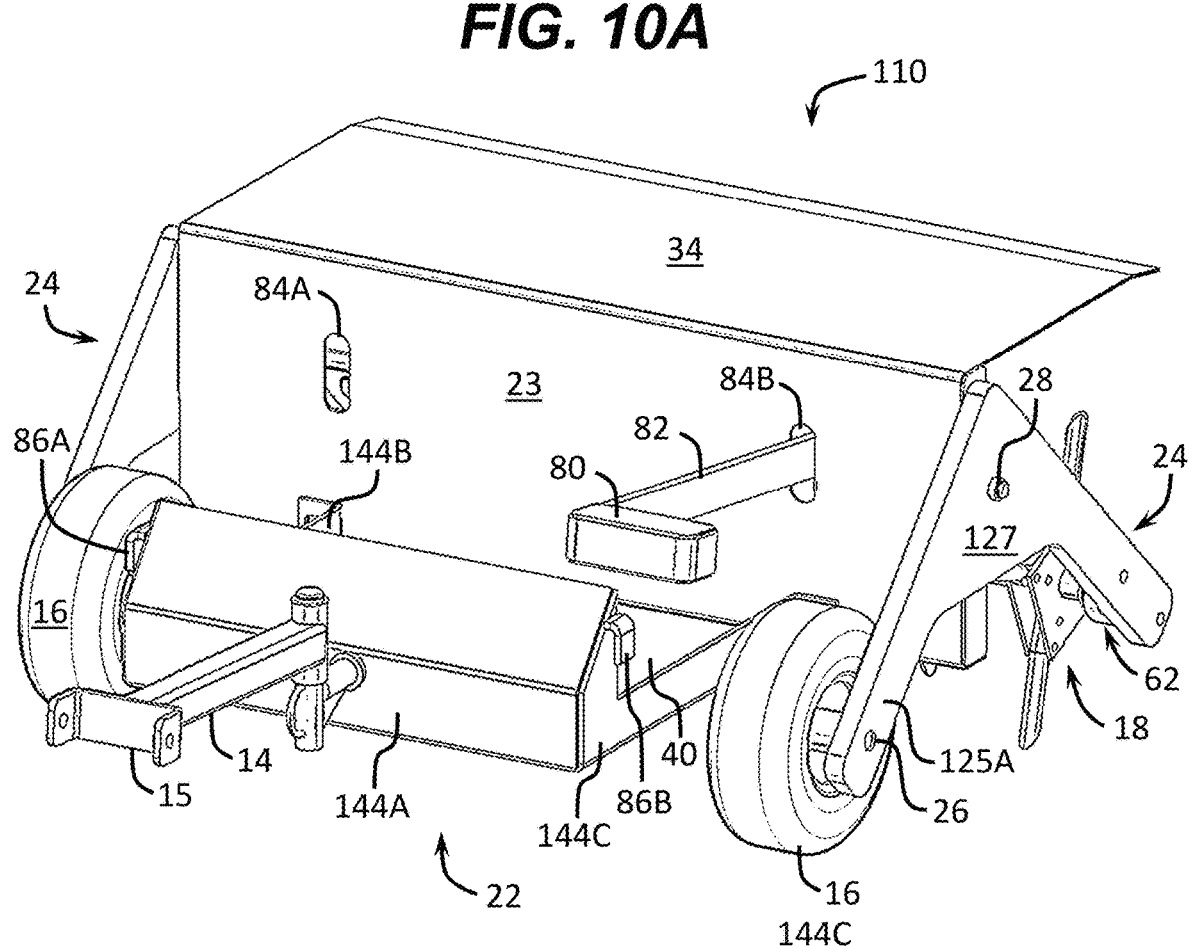
FIGS. 10A-10E show various views of an illustrative ground treatment device according to another embodiment.
Figure 10F:
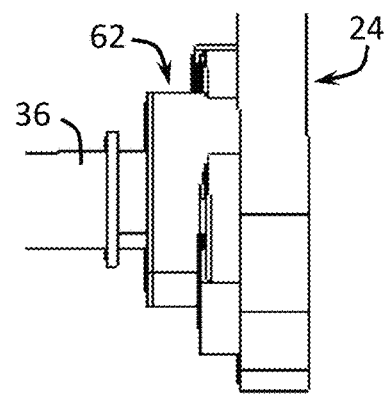
FIG. 10F shows an enlarged rear elevational view of an attachment mechanism according to an embodiment.
Figure 10B:
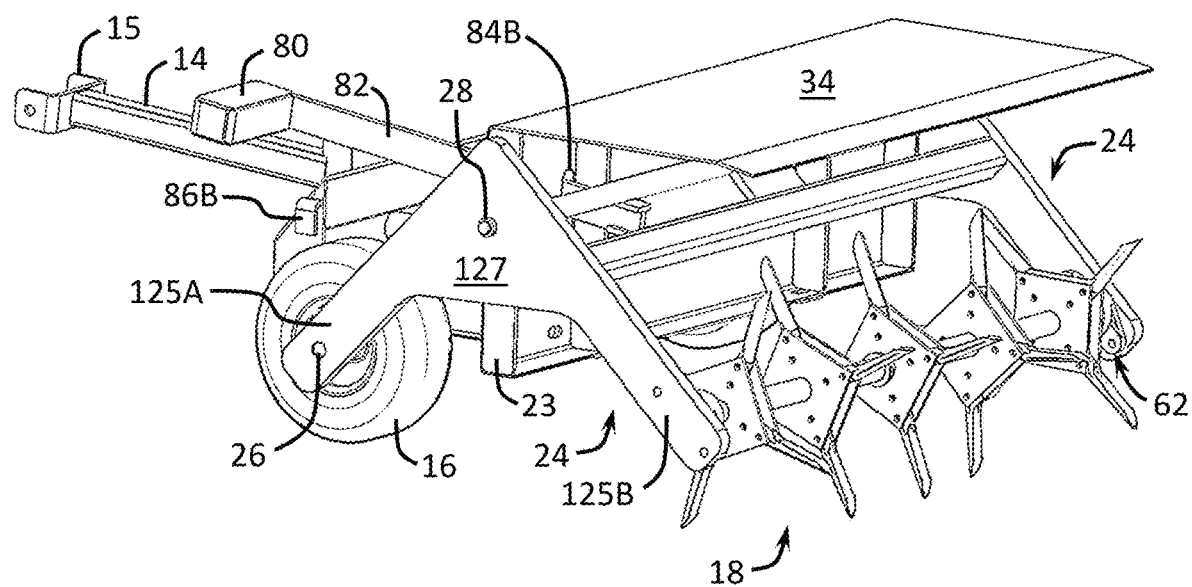
Figure 10C:
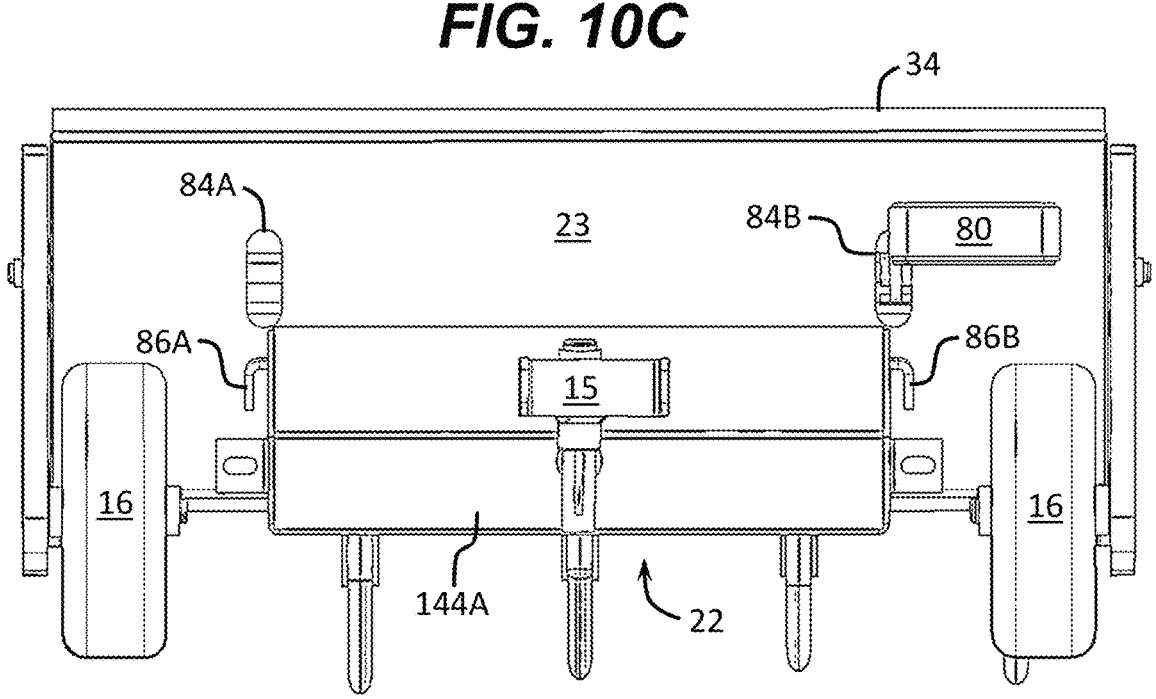
Figure 10D:
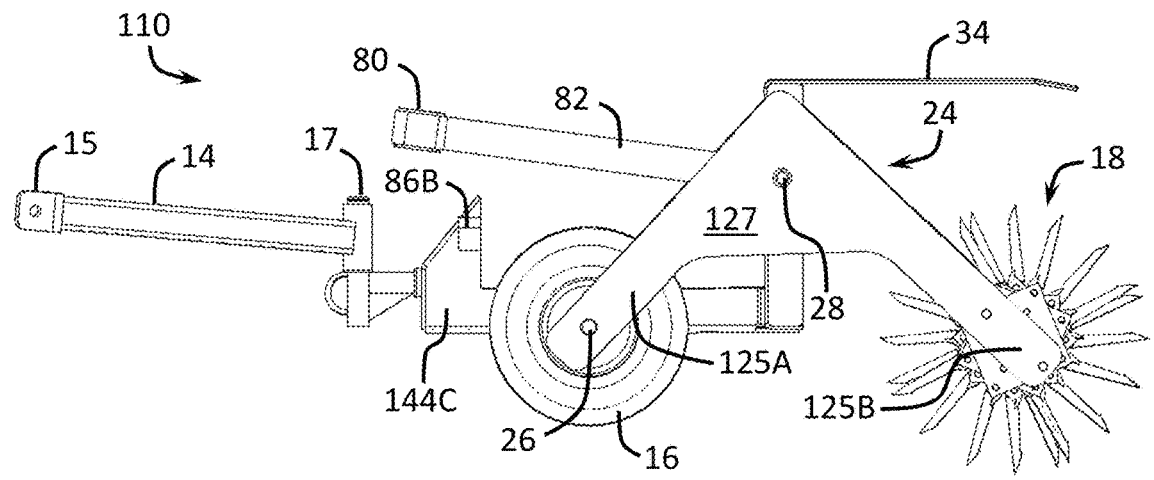
Figure 10E:
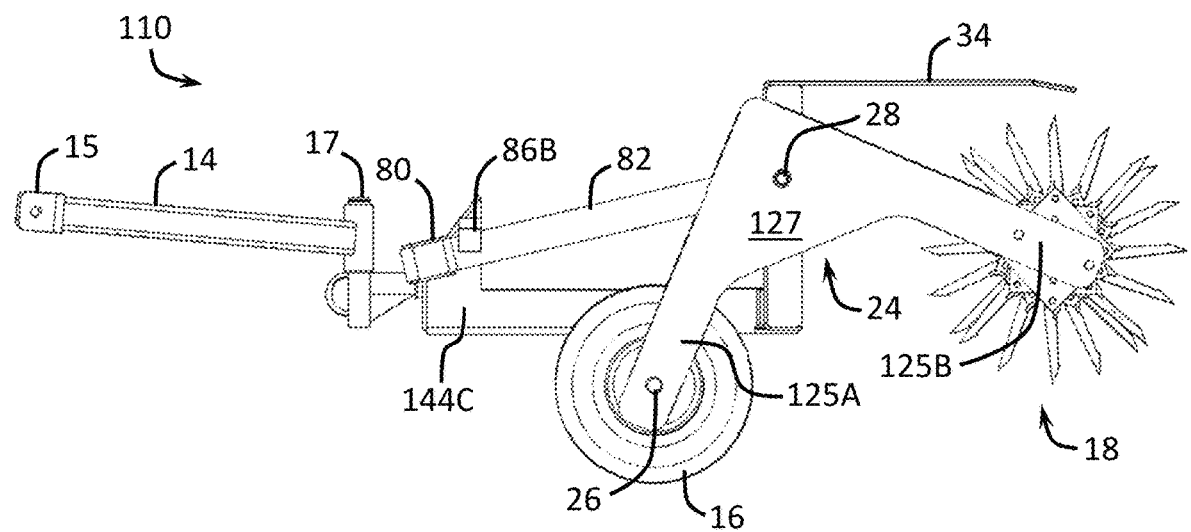

It is understood that the aeration device 10 is only illustrative of various alternative, substantially equivalent configurations of a ground treatment apparatus described herein. To this extent, FIGS. 10A-10E show various views of an illustrative ground treatment device 110 according to another embodiment. FIG. 10A shows a front left perspective view; FIG. 10B shows a rear left perspective view; FIG. 10C shows a front elevation view; FIG. 10D shows a side elevation view; and FIG. 10E shows a side elevation view with a ground treatment component in the raised position, of the ground treatment device 110.

Referring generally to FIGS. 10A-10E, the ground treatment device 110 includes a pull bar 14, attachment mechanism 15, and a pivotal attachment mechanism 17, which collectively enable a temporary, pivotal connection of a base frame component 22 of the ground treatment device 110 to a machine, such as the machine 12 (FIG. 1), as described herein. The base frame component 22 includes a platform 40, a vertically oriented back plate 23, and a safety cover 34, each of which can be configured as described herein. Additionally, the ground treatment device 110 includes a pair of side frame components 24, each of which includes a wheel 16 pivotally connected to a front end using a pivotal connecting mechanism 26, and a ground treatment component (e.g., an aeration component 18) attached to a rear end of each side frame component 24 as described herein (e.g., via an opening in the side frame component or using an attachment mechanism). FIG. 10F shows an enlarged rear elevational view of an attachment mechanism 62 according to an embodiment. The attachment mechanism 62 can comprise a plate attached to a surface, such as an inner surface, of a corresponding side frame component 24 (e.g., via a pair of fasteners, such as bolts and nuts). The attachment mechanism 62 can include an opening shaped and sized to accommodate and secure a shaft 36 of the ground treatment component. Each side frame component 24 is pivotally attached to a corresponding lateral side of the vertically oriented back plate 23 using a pivotal attachment mechanism 28. Each of these components can be configured to operate in the same manner as the corresponding components described herein in conjunction with FIGS. 1-6.

However, the ground treatment device 110 is shown including side frame components 24 formed of a single piece of material (e.g., steel having a thickness of approximately ¾ inch (19 millimeters)) with sufficient strength and durability for use as described herein. Each side frame component 24 has a general A-shaped appearance, with a triangular central area 127 and front and back arms 125A, 125B, respectively extending therefrom, all of which are integrally formed. The dimensions of the triangular central area 127 and each arm 125A, 125B can be sufficient to support the wheels 16 and the ground treatment component during use as described herein. For example, an embodiment of the triangular central area 127 has a vertical height of approximately 7⅜ inches (18.7 centimeters) with sides that extend approximately 9¾ inches (24.8 centimeters) in a direction of each arm 125A, 125B. Additionally, in this embodiment, each of the arms 125A, 125B is formed of steel having a thickness of approximately ¾ inch (19 millimeters), a width of approximately 2.5 inches (63.5 millimeters), and extends beyond the triangular central area by a length of approximately 8 inches (20.3 centimeters).

Additionally, similar to the aeration device 10, the base frame component 22 is shown including vertically oriented walls 144A-144C (e.g., a kick plate) extending above the forward portion and lateral sides of the platform 40. As illustrated, the forward vertically oriented wall 144A can include a first portion that is substantially vertically oriented and a second portion that is angled over the front area of the platform 40. The first portion can extend to a height sufficient to allow a user's footwear (e.g., boots), to fit below the second portion. However, it is understood that this configuration of the walls 144A-144C is only illustrative of various possible configurations. Regardless, the walls 144A-144C can be permanently fixed to the platform 40 and to each other using any solution (e.g., welded). The walls 144A-144C can be formed of any suitable material (e.g., approximately ¼ inch (6.5 millimeters) steel) having sufficient strength and durability to support attachment of the pivotal attachment mechanism 17 to the base frame component 22 and use of the ground treatment device 110 as described herein.

The ground treatment device 110 is also shown including an alternative mechanism for enabling the ground treatment component to be selectively secured in an elevated position (e.g., to facilitate transport of the ground treatment device 110). In this case, the mechanism can be operated by a user while standing on the platform 40. For example, the mechanism includes a foot pedal 80 located on one end of an arm 82, which can extend through an opening 84B in the back plate 24 and can be located above a lateral side of the platform 40. While shown located on the left side, it is understood that the foot pedal 80 and arm 82 could be located on the right side of the platform 40 or have another location relative to the platform 40. To this extent, as illustrated, the back plate 23 and base frame component 22 can be configured to support selective placement and operation of the foot pedal 80 and arm 82 of the lift mechanism on either side of the platform 40. Regardless, the foot pedal 80 should be located so as to not interfere with a user standing on the platform 40 or operation of the ground treatment device 110. While a foot pedal 80 is shown as an illustrative mechanism for allowing the user to lift and lower the ground treatment component while remaining on the platform 40, it is understood that this is only illustrative, and other solutions can be implemented, such as a hand operated lifting/lowering mechanism.

To secure the ground treatment component in an elevated position, the base frame component 22 is shown including locking mechanisms 86A, 86B located on each side of the platform 40. In particular, each locking mechanism 86A, 86B is shown as an inverted tab, which can be permanently attached to the corresponding wall 144B, 144C, respectively, using any solution (e.g., welding). The locking mechanisms 86A, 86B can be formed of any suitable material (e.g., steel) sufficiently strong to support the arm 82, which is used to selectively raise and lower the ground treatment component.

To this extent, a user standing on the platform 40 can operate the lift mechanism to selectively raise and lower the ground treatment component, which can be attached to the back arms 125B of the side frame components 24. In operation, the user can press down on the pedal 80 of the lift mechanism to cause the ground treatment component to elevate above the ground. Upon reaching a sufficient height, the user can move the arm 82 (e.g., with his or her foot) under the corresponding locking mechanism 86B located on a sidewall 144C of the kick plate and allow the arm 82 to elevate into the opening, thereby securing the arm 82 in place. To lower the ground treatment component, the user can press down on the foot pedal 80 to move the arm 82 out of the bottom of the opening of the locking mechanism 86B, move the arm 82 out from under the opening (e.g., with his or her foot), and allow the arm 82 to elevate above the locking mechanism 86B, thereby allowing the ground treatment component to be lowered to the ground.

To lift and lower the ground treatment component, the opposing end of the lift mechanism arm 82 can be pivotally attached to the vertically oriented back plate 23, or a component located close thereto and/or integrated therewith, and extend under or be pivotally attached to a lateral support structure physically connecting the side frame components 24. For example, FIG. 11 shows details of an illustrative vertically oriented back plate 23 and lift mechanism of a ground treatment device according to an embodiment. In this case, the back plate 23 includes multiple vertical support structures 88A-88E. For example, the vertical support structures can include vertical support structures located at each end of the back plate 23 (e.g., as illustrated by vertical support structure 88A) and vertical support structures located close to and on opposing sides of each opening in the back plate 23. For example, the vertical support structures 88B, 88C can be located on opposing sides of the opening 84B (FIGS. 10A-10C), while the vertical support structures 88D, 88E are shown located on opposing sides of the opening 84A. As shown, an opening can be located closer to one vertical support structure. In an alternative embodiment, a vertical support structure can be located near only one side of the opening instead of on both sides of the opening.

The back plate 23 is further shown including a pivotal attachment mechanism 128, which can comprise a round lateral support element that extends laterally through each vertical support structure 88A-88E in a location aligned with the openings 84A, 84B. The pivotal attachment mechanism 128 can enable pivotal attachment of each side frame component (e.g., the triangular central area 127 of each side frame component) to the back plate 23 as described herein. Additionally, the arm 82 can include an opening through which the pivotal attachment mechanism 128 extends, thereby providing a pivotal attachment point for the arm 82 as well as both side frame components.

As previously discussed, the side frame components can be attached to one another by one or more stabilizers. For example, the triangular central area 127 of each side frame component can be attached to stabilizers 164A, 164B using any solution. As illustrated, an end of the arm 82 can extend under and slightly beyond a stabilizer 164B, which can act as a lateral lifting support element. In this case, the stabilizer 164B can extend laterally between the side frame components at a location that is behind and above that of the pivotal attachment mechanism 128. As shown, the end of the arm 82 can include a flat region 83, which can assist in causing the arm 82 to maintain good contact with the stabilizer 164B during use. The stabilizer 164B can be round to allow the flat region 83 to readily pivot about the stabilizer 164B during lifting and lowering of the ground treatment component. In this configuration, pushing down on the pedal 80 (FIGS. 10A-10E) causes the flat region 83 of the arm 82 to pivot about the round pivotal attachment mechanism 128 and lift the stabilizer 164B, thereby causing the side frame components to rotate and the ground treatment component to elevate off of the ground as shown in FIG. 10E. As illustrated, the stabilizers 164A, 164B can be permanently attached to one another in one or more locations using any type of attachment mechanism 165 (e.g., a welded attachment piece).

In another embodiment, the invention provides a method of treating ground using a ground treatment device having one or more features described herein. For example, the method can include attaching the aeration device 10, the dethatching device 50, 70, or the ground treatment device 110, to a self-propelled machine 12 and operating the self-propelled machine 12 while standing on the platform 40 to treat the ground, e.g., to aerate or dethatch some or all of a lawn. Furthermore, when the self-propelled machine 12 comprises a lawnmower, the method can include concurrently mowing the lawn and performing a second ground treatment operation, such as aerating or dethatching, on the lawn.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An apparatus configured for use with a machine, the apparatus comprising:
   a base frame component including:
      a vertically oriented back plate; and
      a horizontally oriented platform extending forward from a bottom, central portion of the vertically oriented back plate;
   means for pivotally connecting the base frame component to the machine;
   a pair of wheels; and
   a pair of side frame components pivotally mounted to opposing ends of the base frame component at side frame mounting locations aligned with a vertical plane including opposing ends of the vertically oriented back plate, each side frame component including:
      a first end including a wheel mounting location at which a wheel of the pair of wheels is pivotally mounted in a location laterally adjacent to the horizontally oriented platform; and
      a second end, the second end including a ground treatment component mounting location configured for mounting a ground treatment component, wherein the side frame mounting location forms a vertex of a fixed inverted angle defined by the wheel mounting location and the ground treatment component mounting location.

2. The apparatus of claim 1, wherein each of the pair of wheels is mounted between the horizontally oriented platform and a corresponding side frame component.

3. The apparatus of claim 1, the base frame component further including a horizontally oriented safety cover extending from a top of the vertically oriented back plate in a direction opposite the horizontally oriented platform, wherein the horizontally oriented safety cover is configured to extend over at least a portion of the ground treatment component.

4. The apparatus of claim 1, wherein each side frame component includes a front arm and a back arm, wherein the front arm and the back arm are oriented to form a second fixed inverted angle.

5. The apparatus of claim 1, further comprising a stabilizer attached to each side frame component.

6. The apparatus of claim 1, wherein the machine is a walk-behind lawnmower.

7. The apparatus of claim 1, wherein the means for pivotally connecting includes a pull bar extending from a front of the base frame component, wherein the pull bar is capable of horizontally rotating with respect to the base frame component.

8. The apparatus of claim 1, wherein the pair of wheels support the base frame component during transport of the apparatus and use of the ground treatment component.

9. An apparatus configured for use with a machine, the apparatus comprising:
   a base frame component including a horizontally oriented platform on which a user of the apparatus stands while utilizing the apparatus;
   an attachment mechanism for attaching the base frame component to the machine;
   a pair of wheels;
   a pair of side frame components, each side frame component including:
      a front arm and a back arm, wherein the front arm and the back arm are oriented to form a fixed inverted angle, and wherein the front arm extends laterally adjacent to the horizontally oriented platform;
      a central region permanently attached to the front arm and the back arm forming the fixed inverted angle, wherein the central region is pivotally mounted to the base frame component at a mounting location located behind the horizontally oriented platform and the front arm;
      a ground treatment component mounting location configured for mounting a ground treatment component to the back arm; and
      means for pivotally mounting a wheel of the pair of wheels to the front arm.

10. The apparatus of claim 9, wherein the base frame component further includes a vertically oriented back plate, wherein the central region of each angled side frame component of the pair of angled side frame components is rotatably mounted to the base frame component at a location aligned with a plane including opposing ends of the vertically oriented back plate.

11. The apparatus of claim 9, further comprising the ground treatment component mounted to the pair of angled side frame components.

12. The apparatus of claim 11, wherein the ground treatment component is an aerating component.

13. The apparatus of claim 11, wherein the ground treatment component is a dethatching component.

14. The apparatus of claim 9, further comprising a stabilizer attached to each side frame component.

15. A ground treatment apparatus comprising:
a base frame component including:
  a vertically oriented back plate; and
  a horizontally oriented platform extending from a bottom of the vertically oriented back plate;
an attachment mechanism for temporarily attaching the base frame component to a machine;
a pair of wheels;
a pair of side frame components mounted to opposing ends of the base frame component, each side frame component including:
  a front arm to which a wheel of the pair of wheels is pivotally connected, wherein the pair of wheels are located adjacent to the horizontally oriented platform;
  a back arm including a ground treatment component mounting location configured for mounting a ground treatment component; and
  a central region permanently attached to the front arm and the back arm, wherein the central region is pivotally mounted to the base frame component at a location aligned with a vertical plane including opposing ends of the vertically oriented back plate; and
the ground treatment component mounted to the back arm of each angled side frame component of the pair of angled side frame components at the corresponding ground treatment component mounting locations.

16. The apparatus of claim 15, further comprising:
the machine, wherein the attachment mechanism includes a pull bar extending from a front of the base frame component, wherein the pull bar is capable of horizontally rotating with respect to the base frame component.

17. The apparatus of claim 16, wherein the machine is a walk-behind lawnmower, and wherein the ground treatment component is one of: an aerating component or a dethatching component.

18. The apparatus of claim 1, wherein the ground treatment mounting location comprises an opening in the second end of the corresponding side frame component.

19. The apparatus of claim 18, further comprising the ground treatment component mounted to the pair of side frame components, wherein the ground treatment component includes a shaft inserted through the openings in the side frame components.

20. The apparatus of claim 9, wherein the ground treatment mounting location comprises an opening in the back arm of the corresponding side frame component.

* * * * *